UNITED STATES PATENT OFFICE.

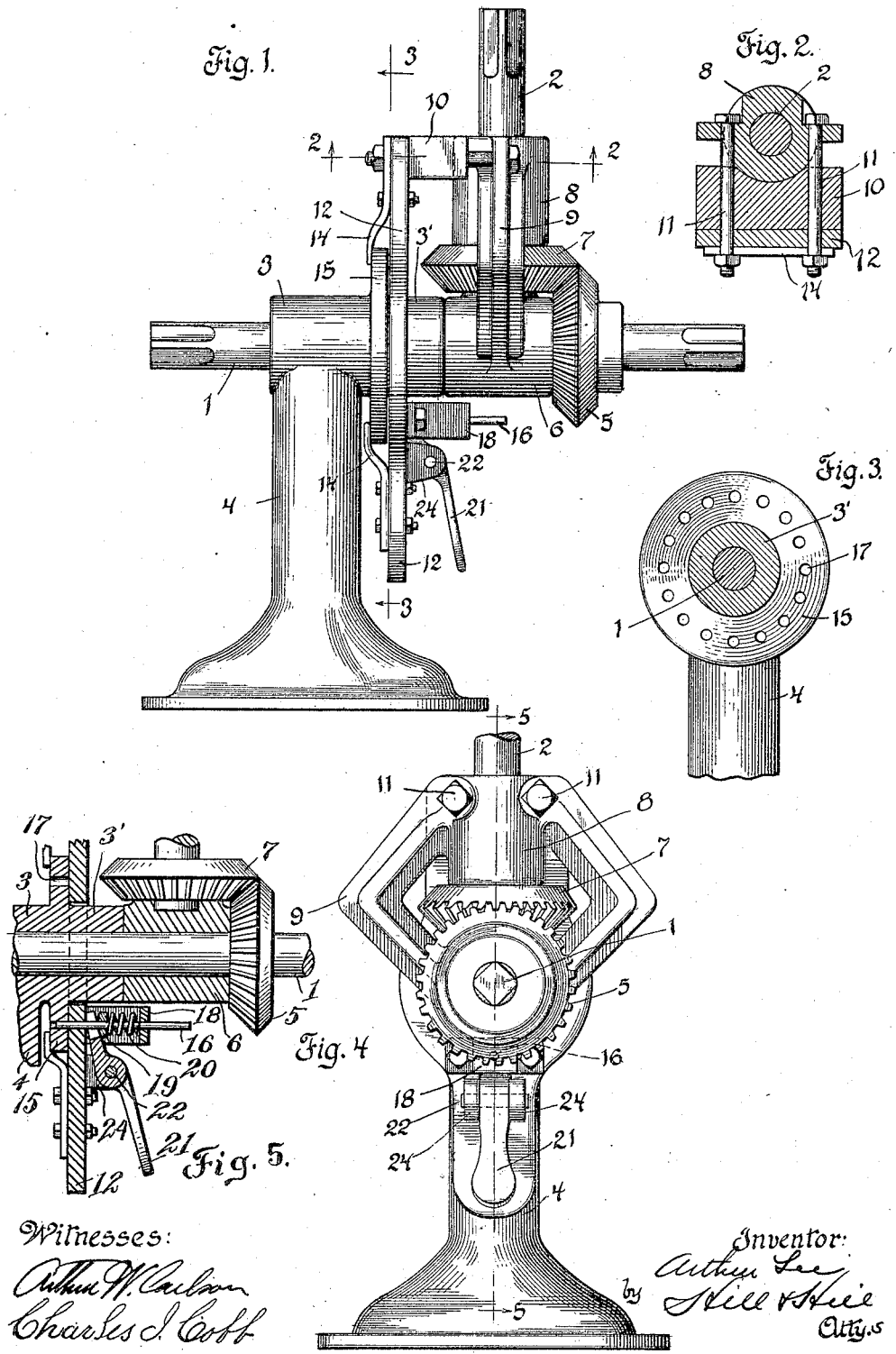

ARTHUR LEE, OF UNION HILL, ILLINOIS.

POWER-TRANSMISSION MECHANISM.

1,182,182. Specification of Letters Patent. Patented May 9, 1916.

Application filed December 3, 1913. Serial No. 804,353.

*To all whom it may concern:*

Be it known that I, ARTHUR LEE, a citizen of the United States, residing at Union Hill, in the county of Kankakee and State of Illinois, have invented certain new and useful Improvements in a Power-Transmission Mechanism, of which the following is a description.

My invention belongs to that general class of devices for transmitting power, and relates to a power transmission mechanism for transmitting power from a suitable source of energy to the desired machine or machines.

The device herein described is particularly adapted and designed to be used in connection with my portable power transmission device described in my pending application filed October 2, 1912, Serial No. 723,534, for use on farms for driving different kinds of machinery, as for example, churns, washing machines, pumps, grindstones, shellers, or similar tools and appliances, and the various other machines that are commonly used upon farms. With it one or more pieces of apparatus may be driven from a single shaft without the use of countershaft and intermediate belting, and the like.

The invention has among its objects the production of an attachment or device of the kind described that is simple, convenient, efficient, and satisfactory; that may be manufactured at comparatively small cost, and used wherever found applicable.

To this end my invention consists in the novel construction, arrangement and combination of parts herein shown and described, and more particularly pointed out in the claims.

In the drawings, wherein like reference characters indicate like or corresponding parts, Figure 1 is a side elevation of my device, provided with one form of base or support; Fig. 2 is substantially a sectional view taken on line 2, 2 of Fig. 1; Fig. 3 is substantially a sectional view taken on line 3, 3 of Fig. 1; Fig. 4 is a view similar to Fig. 1 with the device given a quarter of a turn to show another side; Fig. 5 is substantially a sectional view taken on line 5, 5 of Fig. 4.

Referring to the drawings, in which my preferred form of device is shown, 1 and 2 represent two shafts, one of which, as shown shaft 2, is adjustable about the other through an angle of 360°, or less, as may be desired. As shown, the shaft 1 is supported in a suitable part 3, which, in the construction shown in Fig. 2, is carried by a support 4, which may be placed upon a box, block, or the ground, or wherever desired. It may be fastened down, or not, as may be found expedient. The shaft 1 is provided with a gear 5, secured thereto, and also carries an adjustable bearing 6, which, in the preferred construction, is arranged between the gear 5 and extended end $3^1$ of the bearings 3. The adjustable bearing 6 and shaft 1 carry the end of the shaft 2, which shaft is provided with a gear 7, secured thereto and arranged to mesh with the gear 5. A collar or additional bearing 8 is also provided on the shaft 2, the same being connected to the collar or bearing 6 by the brackets or parts 9. These parts are shown on both sides, but may be formed upon one side only, if desired, the combination shown being somewhat stronger. As is obvious, with these adjustable bearings, the shaft 2 may be adjusted about the shaft 1 as desired.

Any desired means may be provided for maintaining the bearings and shaft in the desired positions, relative to the bearing 3 and shaft 1. As shown, a part 12 is rotatably arranged on the end $3^1$ of bearing 3, and provided with an extension 10, which is preferably secured by bolts 11, or their equivalents, to the collar 2. Secured to bearing 3, as shown, formed integral therewith, is a plate 15, provided with the desired number of holes 17 therein, or their equivalents. One part, as shown the plate 12, is preferably provided with fingers 14 extending over the plate 15, so as to maintain the two in close contact. Part 12 carries a pin 16, arranged to engage in the holes 17 in plate 15, so as to lock the parts in the desired positions relative each other. The construction is most clearly shown in Fig. 5. Referring to this figure, the pin 16 is carried by a bracket 18, and is normally maintained in engagement with plate 15 by a spring or its equivalent 20, arranged between the collar 19 and the part 18. Carried by the part 12 is a suitable lever 21, having an end 23 arranged to engage with the collar 19, the lever 21 being pivoted at 22 to the brackets 24. Pushing or moving the free end of the lever 21 toward plate 12, withdraws the pin from engagement with the plate 15. The pin may be positioned in any desired hole so as to lock part 12 against movement, and consequently retain the shaft 2 in the desired adjustment, which adjustment, of course, is determined by where the power is to be transmitted to or received from, as the case may be. It might be mentioned that any suitable equivalent for the pin 16, and holes in the plate 15, may be employed. The construction herein described, however, is adjustable without requiring tools, and in an instant.

As was previously mentioned, the device is particularly intended and desirable for use in connection with my portable power transmission mechanism, but its use is not confined to that. Power may be transmitted to receive it from either end of the shaft 1, or transmitted to or received from the end of shaft 2. Likewise, with trifling modifications, it might be arranged for more than the number of shafts shown in the drawings.

Having thus described my invention, any immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a device of the kind described and in combination, a shaft, a bearing therefor, a second shaft, an adjustable bearing therefor carried by said first mentioned shaft, and adjustable means for positively locking said second bearing in the desired position comprising a plate rotatively mounted on said first bearing, and operatively connected with said adjustable bearing, said first mentioned bearing provided with a flange having a plurality of perforations therethrough, means for maintaining said plate in close relation with said flange, a pin carried by said plate and movable into engagement with said flange, means for yieldingly maintaining said pin in engagement with said flange, and means for moving the pin lengthwise out of engagement with the flange as desired.

2. In a device of the kind described and in combination, a rotatable shaft, a bearing for carrying said shaft, a suitable support for said bearing, a gear secured on said shaft, a second bearing arranged on said shaft and carried thereby between said gear and said first mentioned bearing, a second shaft having its end rotatably carried by said second bearing, a collar bearing arranged on said second shaft and operatively connected with said second bearing, a gear secured to said second shaft between the second mentioned bearing and said collar bearing, and arranged to mesh with said first mentioned gear, and means for adjustably securing said collar bearing to the first mentioned bearing, comprising a plate rotatably arranged on said first mentioned bearing, said plate connected with said collar bearing, and means carried by said plate for engaging a portion of said first mentioned bearing.

In testimony whereof, I have hereunto signed my name in the presence of two subscribing witnesses.

ARTHUR LEE.

Witnesses:
 JOHN WAGNER,
 ADAM WAGNER.

Copies of this patent may be obtained for five cents each, by addressing the "Commissioner of Patents, Washington, D. C."